3,120,437
VESICULAR PHOTOGRAPHIC REPRODUCTION PROCESS UTILIZING A VOLATILE LIQUID MODIFYING AGENT
Robert M. Lindquist, Los Gatos, Calif., assignor to International Business Machines Corporation, New York, N.Y., a corporation of New York
No Drawing. Filed Oct. 16, 1959, Ser. No. 846,812
7 Claims. (Cl. 96—49)

This invention relates to a photochemical technique and to a photosensitive film used in such technique.

Within recent years there has been developed a photochemical technique for photoreproduction which relies upon photochemically induced decomposition of a compound to release a gas. More specifically a film of suitable thermoplastic material such as Saran is employed and in this film is incorporated a diazo compound which is sensitive to radiation within a certain ultraviolet frequency band. This diazo compound is decomposed by the radiation to yield nitrogen. Upon exposure in this manner the film develops a latent image, that is to say, an invisible image which, however, can be developed by appropriate procedure to produce a visible image. The image is developed by heating the film whereupon the nitrogen which has been released as a result of exposure and which is still contained in the film expands to form bubbles. These bubbles are visible by reason of their different refractive properties. That is to say, their refractive index is different than the refractive index of the body of the film material and they are visible in the same manner that bubbles of gas are visible in a body of water or in any other transparent fluid.

An image is formed by this means. If the image is formed by passing radiation through, say, a microfilm negative, the clear, radiation-transmitting areas of the microfilm negative will pass the radiation and the darker, nonradiation-transmitting areas will absorb or prevent passage of the radiation. It will be understood, of course, that as a part of the skill of the art, a proper source of radiation, a proper exposure time and other proper details of procedure will be employed as dictated by experience. In general, ultraviolet radiation and exposure periods of 30 to 60 seconds are commonly used but will vary, of course, from case to case.

In this process, after an exposed film is developed, unreacted diazo compound remains in the unexposed areas of the film. If this unreacted diazo compound is protected from exposure to ultraviolet radiation it will give no trouble. However, it is a disadvantage to require protection at all times from ultraviolet radiation. It is not practical in many cases to protect an exposed developed film from ultraviolet radiation. For example, sunlight itself has enough of the proper ultraviolet component to cause a gradual decomposition of the previously unexposed, unreacted diazo compound. The nitrogen released thereby may collect in the form of small bubbles and cause fogging or deterioration of the film. Also it is a frequent practice to view photocopies made in accordance with this technique by means of high powered lamps. The light from such a lamp may have a radiation component which will cause deterioration of the film.

A technique which is employed to overcome this disadvantage consists of re-exposing the developed film in its entirety to ultraviolet radiation, the object being to decompose the diazo compound in those areas initially unexposed. This re-exposed film is then stored in a cool place to avoid expansion of the nitrogen released by the atmosphere and therefore to avoid bubble formation. The released nitrogen gradually diffuse to the atmosphere.

It is a disadvantage of this fixing procedure that a long period of time is required for diffusion of the nitrogen gas released on the re-exposure. To be safe the diffusion of nitrogen gas to the atmosphere must take place at a low (e.g., room) temperature, otherwise bubble formation may occur. But at low temperatures the diffusion of gas through the film is slow.

To some extent this disadvantage can be obviated by heating the re-exposed film to a mildly elevated temperature which is high enough to promote diffusion of the gas out of the film but low enough not to cause bubble formation. This, however, requires care and is an added step and constitutes a disadvantage.

It is an object of the present invention to improve upon the photochemical, photographic technique described above.

It is a further and particular object of the invention to provide a means whereby film of the character described (i.e., a film having therein a photosensitive diazo compound or the like which releases a gas on exposure to selected radiation) can be both developed and fixed in a short period of time to produce a stable, light and temperature insensitive photoreproduction.

The above and other objects of the invention will be apparent from the ensuing description and the appended claims.

I have discovered that an image can be successfully reproduced on a film of the character described by what may be called a "reversal" of the technique described above. I have found that, if this "reversal technique" is employed and if a modified form of film is used, the film can be exposed, developed and fixed within a very short period of time; all of the photosensitive compound can be exposed; and a light and heat stable film can be produced which has an image of high quality.

By "reversal technique" is meant a procedure as follows:

The film is exposed. Then the exposed film, instead of being heated to develop gas bubbles and thereby form an image, is allowed to stand for a sufficient interval of time, either at ambient temperature or preferably at a mildly elevated temperature. During this interval of time the gas released in the exposed areas diffuses to the atmosphere, thereby leaving permanently clear areas corresponding to the exposed portion and therefore constituting the image. As yet, the image is latent because it cannot be optically distinguished from the unexposed areas, which are also clear. The entire film is then re-exposed to the proper radiation whereupon gas is released in the previously unexposed areas of the film. This portion is then fixed or developed by heating to expand the released gas and to form bubbles.

It will be seen that this is truly a "reversal technique" because the latent image produced by the first exposure becomes a clear area and the area initially unexposed becomes a visible area by reason of bubble formation.

By this means a developed and fixed film is produced which is opposite in sign to the film produced by the standard technique. By "standard technique" is meant exposing, developing the exposed areas by heating to form bubbles, then re-exposing and allowing the gas formed by re-exposure to diffuse to the atmosphere.

By means of the "reversal technique" a high quality, light and heat stable picture is produced, but the process as carried out with commercially available film is time-consuming. It is time consuming because the diffusion of the gas produced by the initial exposure and before the second exposure requires a considerable period of time of the order of hours. The time required for diffusion of gas formed by the first exposure can be cut down to some extent by employing a mildly elevated temperature, insufficient to cause bubble formation but sufficient to hasten diffusison of the gas. However, the time required is still rather long.

I have discovered that the reversal technique described above can be greatly accelerated by employing a suitably modified film, which will now be described.

Film heretofore used for the purpose is prepared by laying down or casting on a suitable base such as a film of cellulose triacetate, a polyester such as Mylar, or styrene, a solution of a suitable vehicle (such as Saran), a modifier (such as polymethylmethacrylate), a photosensitive diazo compound and a solvent. This film is then heated sufficiently, for example, at 95° C. for thirty minutes to remove all of the solvent except for a trace.

When film of this character is employed the diffusion of gas released by exposure is very slow. I have discovered that if a small but substantial quantity of a suitable modifying agent is incorporated in the film (i.e., in the film after it has been manufactured but before it has been exposed), the rate of diffusion of the released gas is greatly accelerated.

The following specific example will serve to illustrate the nature and the practical application of this discovery:

*Example*

A 30% solution of Saran F220 in methylethylketone was employed. (Saran is a trademark for a vinylidene chlorideacrylonitrile copolymer. Saran F220 is a copolymer of 80 parts vinylidene chloride and 20 parts acrylonitrile.) To 10 milliliters of this solution were added 225 milligrams of p-diazodimethylaniline zinc chloride dissolved in 5 milliliters of acetonitrile. This is a typical and preferred diazo compound for use in the technique described hereinabove. To the combined solution was added a further quantity of methylethylketone to make a total volume of 25 milliliters. This solution was then applied to a base of Mylar film, 3 mils in thickness (Mylar is a trademark for a polyester resin). The solvent in the film of Saran thus applied was allowed to evaporate until approximately 6% of solvent remained. (This proportion of residual solvent was determined by heating samples of similar film on a similar base for a 220° F. for five minutes which, as shown by tests, produced a film of constant weight.) Inasmuch as the methyl ethylketone (the major solvent) and acetonitrile (the minor solvent, employed to dissolve the diazo compound) have approximately the same boiling points, the proportions of each in the residual 6% of solvent were approximately the same as in the solution before the drying step. This Saran film contained 0.75 milligram of solid per square centimeter.

This film, containing about 6% of solvent, most of which was methylethylketone, was placed in juxtaposition to an exposed, developed microfilm and was exposed 8" from the source through the microfilm to ultraviolet radiation from a 250 watt high pressure mercury arc of the UA–2 ultraviolet type. The exposure time was 20 to 25 seconds. (These exposure conditions are conventional for the photo processes described herein, both those of the invention and those of the prior art.) The exposed film was developed and fixed as follows:

It was held for thirty seconds on a hot plate at 110° F.; then for 30 seconds on a hot plate at 155 to 160° F.; then at 200 to 210° F. on a hot plate for 1 minute. Total development time (excluding time for transfer from one hot plate to another, which could be eliminated in commercial processing equipment) was 2 minutes. The entire film developed in this manner was next exposed to the same radiation source for 25 seconds and the re-exposed film was run over a hot roll at 210 to 240° F.

By this means a reverse image was obtained, that is, an image clear in the initially exposed areas and cloudy due to bubble formation in the initially unexposed areas.

In the above example Saran F220 was the vehicle, and methylethylketone was the modifying solvent, with a small amount of acetonitrile present because it was the solvent for the diazo compound. I have carried out the procedure and demonstrated its operativeness with Saran F242 as the vehicle and tetrahydrofuran as the principal modifying solvent; also with the following vehicle-modifying solvent combinations: Saran F220-acetone; Saran F242-cyclohexanone; Saran F220-ethylacetate; Saran F220-3-methyl-2-butanone; Saran F220-tetrahydrofuran; Saran F220-cyclopentanone. I have also used propionitrile and a blend of ½ part butyronitrile and 4½ parts acetonitrile as the solvent for the diazo compound.

The novel phenomena involved were as follows: The gas released by the initial exposure was caused to diffuse to the atmosphere, thereby developing the latent image (which remained latent until the last step) as an area of permanent clarity. The shortness of time required for diffusion (about 2 minutes) was due to the effect of the residual 6% of solvent. At the low temperatures involved (110° F. initially, which was raised gradually) this solvent was effective to alter the film by making it less rigid and more plastic, hence more highly permeable to the gas. The gas therefore diffused rapidly rather than slowly at a relatively low temperature, such low temperature being insufficient to cause bubble formation.

Concurrently with this diffusion process, and as an added and important advantage of the procedure of the present invention, most or all of the modifying solvent was also driven out of the film. That is, the solvent was driven out of the film not only in the exposed areas but also in the unexposed areas. This voiding of solvent from the film has a double advantage. Thus if the solvent were permitted to remain in the film after development and fixing it would adversely affect the physical properties of the film. Also, if the solvent were to remain in the film after developing the initially exposed area, then during the subsequent fixing step, that is, the re-exposure and reheating the solvent would accelerate gas diffusion. At this stage (re-exposure and reheating) gas diffusion is an undesirable process which competes with the desired process of bubble formation. The fact that the solvent has been removed in the first developing step immediately following the first exposure has therefore the important advantage that the unexposed portion of the film is conditioned by removal of the solvent to favor bubble formation rather than gas diffusion.

Therefore, it will be seen that the solvent favors one of the two competitive physical processes, that is, it favors gas diffusion over bubble formation. By proper selection of the kind and character of solvent and the conditions under which the process is carried out, the solvent is present when the favored process (diffusion) is desired but it is absent or present in minimal amount when the other process (bubble formation) is desired.

I have found that a certain amount of trial and error are required to determine the optimum conditions for diffusion of the gas and solvent from the film after the initial exposure. On the one hand, the presence of the modifying agent or solvent will accelerate diffusion of the gas at ambient temperature. That is, the exposed film can be set aside at room temperature and the gas allowed to diffuse out of the film. This diffusion is accelerated by the modifying agent, but it nevertheless proceeds rather slowly. At the other extreme, if the temperature is raised rapidly to about 200° F. there is a much greater likelihood of bubble formation. Factors affecting the results include the thickness of the film (thicker films requiring more time for diffusion, hence allowing more opportunity for bubbles to form); the nature of the vehicle (some vehicles being more and some being less permeable to the gas); the nature of the modifying solvent, e.g., whether it is a better or a poorer plasticizer; and the proportion of solvent (excessive solvent will so soften the structure of the vehicle that it may promote bubble formation, and too little solvent may leave the vehicle too impermeable).

I have found as the result of many tests that a preferred procedure is to subject the exposed film to a heat gradient by commencing the heating at a temperature of about 100° F. and raising it over a period of time (e.g., 30 seconds to 2 minutes) to about 200° F. This procedure has the advantage that at the initial lower temperatures the gas is driven out and at the subsequent higher temperatures the modifying solvent is driven out. The molecules of nitrogen, being smaller, diffuse more rapidly whereas the molecules of solvent, being larger, diffuse more slowly. Therefore the gas is driven out at the lower end of the temperature gradient when conditions are not as favorable to bubble formation, and when the gas has been driven out in this manner it is then safe to heat the film to a higher temperature such as 200° F.

The procedure described in the above specific example is illustrative, but it will be apparent to one skilled in the art that instead of transferring the exposed film from one hot plate to another it is preferable to employ a single heating zone having a suitable temperature gradient, and to pass the film continuously through such zone.

Generally stated, therefore, my improved reversal technique is as follows:

A photosensitive film is provided whose photosensitive component yields a gaseous decomposition product on exposure to radiation. This film is essentially composed of a material through which the gas diffuses slowly at an elevated temperature compared to the formation of bubbles. This property of the film, that is to say, slow diffusivity and relatively rapid bubble formation is, however, modified in accordance with the invention by introducing a volatile solvent. This solvent is one which is compatible with the film (i.e., soluble in the organic structure of the film) and which will, when dissolved therein in relatively small but substantial amount such as 2 to 10%, soften the organic structure, make it more plastic and more gas permeable and less likely to cause bubble formation. The solvent also has the desirable property of itself diffusing out of the film during the initial development step, at an elevated temperature so that, during heat treatment of the re-exposed film, it will not be present in sufficient amount to modify the film and to favor diffusion over bubble formation. The solvent diffusion lags behind the gas diffusion.

To this end and within the scope of the teaching herein a number of substitutions can be made in the materials and steps of the foregoing specific example.

Thus the basic film structure may be any thermoplastic film-forming material which will meet the requirements of (1) a photosensitive component which is decomposed by radiation in the ultraviolet or visible spectrum to produce a gas such as nitrogen (or, as noted hereinafter, a volatile nongaseous substance); and (2) the character of the film is such that the released gas will diffuse out of the film into the atmosphere upon heating, and will also expand to form gas bubbles. The latter process, that is, bubble formation is favored at temperatures of the order of 200° F. or more.

The modifier for the film may be any volatile liquid (1) which is soluble in and is a solvent for the film, (2) which and when dissolved in the film at concentrations of a few percent will so modify or plasticize the film that diffusion of gas is favored over bubble formation at temperatures of about 100 to 200° F., and (3) which is sufficiently volatile to diffuse rapidly out of the film at temperatures of about 100 to 200° F.

The selection of a vehicle (the film-forming material) and a gas releasing compound are in the category of the skill of the art. That is to say, one skilled in the art may select any vehicle that is known to be operable in the photoreproduction process of the character described. Saran is a preferred vehicle but others which are suitably stable and strong may also be used, for example, polystyrene, polyvinyl chloride, polyvinylidene chloride, copolymers of vinyl chloride and vinylidene chloride, copolymers of vinyl chloride and acrylonitrile and copolymers of styrene and acrylonitrile, etc.

The gas releasing compound is preferably a photosensitive diazo compound such as p-diazo dimethylaniline zinc chloride; p-diazo diphenylamine sulfate; p-chlorobenzene sulfonate of 4-diazo-1-cyclohexylaniline; 4-dimethylamino benzene diazonium chloride, etc. Agents which release carbon dioxide on irradiation and polymers which depolymerize on irradiation to produce volatile monomer molecules may also be used instead of compounds which release nitrogen.

As stated, selection of the above (i.e., of the vehicle and of the photosensitive component) are within the general skill of the art and require no further elaboration herein.

The criteria of selection of a modifying substance to plasticize and render the vehicle more gas permeable are those stated above. That is to say, the modifying agent or solvent should be compatible with, a solvent for the soluble in the vehicle; it should have a plasticizing effect on the vehicle to promote diffusion of the released gas or volatile molecule; and it should be sufficiently volatile to be easily driven out of the vehicle.

Examples of suitable modifiers are ketones having about 3 to 12 carbon atoms such as methylethylketone, acetone, and higher ketones such as diethyl ketone, methylpropyl ketone, ethylpropyl ketones, various heptanones such as 2-heptanone, 3-heptanone and 4-heptanone, also 2-octanone, 2-undecanone, isophorone; esters such as methyl, ethyl, propyl, butyl and amyl acetates, methyl and ethyl propionates, methyl or ethyl butyrates, methyl and ethyl lactates, dimethyltartrate and diethyltartrate; nitriles such as acetonitrile, butyronitrile and propionitrile; and cyclic ketones and ethers such as cyclopentanone, cyclohexanone and tetrahydrofuran.

In selecting a modifier the nature of the vehicle will have to be taken into account. For example, some forms of Saran do not have good solvent properties for acetone. Therefore, if acetone is selected as a modifier, a compatible form of Saran or some other compatible vehicle will be required. Moreover a highly voltaile modifier such as acetone is, of course, more likely to diffuse out of the film during storage, therefore adversely affecting the shelf life of the film before it is used. In such cases the film can be kept sealed, with suitable precautions being taken to use the film soon after the seal is broken. On the other hand, the less volatile modifiers such as the heptanones will require a greater time for diffusion out of the film after the initial exposure. By combining two or more solvents, one of which is more volatile and one of which is less volatile, an optimum modifier can be produced. Examples of blended modifiers that have been used successfully are: 1 part ethyl lactate and 9 parts of methylethylketone; 1 part 2-heptanone and 9 parts methylethylketone; and 4 parts of heptanone with 6 parts of methylethylketone.

In applications of the invention factors which may be considered include the following: If long shelf life is not important a more volatile modifier may be used. On the other hand, if quick diffusion after the initial exposure is not important a less volatile modifier may be used. By employing thinner films of vehicles the rate of development and fixing can, of course, be accelerated.

It will, therefore, be apparent that a novel and advantageous photographic material and technique have been provided.

What is claimed is:

1. A method of photographic reproduction which comprises
   (1) providing a vesicular film formed by
      (I) depositing a liquid solvent solution containing
         (A) a thermoplastic hydrophobic vehicle of a type adapted to serve as the film-forming vehicle for a photolytic compound to form vesicular prints,
         (B) a dissociable photolytic compound which on exposure to radiation undergoes decomposition to produce a gaseous decomposition product, and (C) a modifying solvent comprising an organic, thermally volatile liquid modifier which is soluble in and a solvent for said vehicle as well as being sufficiently volatile to diffuse rapidly out of the vehicle at temperatures of about 100° to 200° F. and which has the property of accelerating diffusion of said gaseous decomposition product from the film, and (II) removing said solvent from the deposited solution until not less than about 2% and up to about 10% of said liquid solvent, based on said vehicle, remains as a residual modifier dissolved in the resulting film;

(2) exposing a portion of the resulting modifier-containing film in a first exposure step to radiation adapted to cause formation of gaseous product by decomposition of said photolytic compound;

(3) heating the resulting exposed film to a temperature and for a time adapted (a) to bring about substantially complete diffusion of said gaseous decomposition product from the film but without bubble formation and (b) to drive off substantially all of said residual modifier;

(4) then exposing substantially the entire film to said radiation in a second exposure step;

(5) and heating the re-exposed film to a temperature and for a time sufficient to cause bubble formation in the areas unexposed during the first exposure step, thereby forming an image corresponding to the portion of the film exposed to radiation in said first exposure step.

2. The method of claim 1 wherein said dissociable compound is a diazo compound which decomposes on radiation to produce molecular nitrogen.

3. The method of claim 2 wherein said vehicle is a vinylidene chloride-acrylonitrile copolymer.

4. The method of claim 3 wherein said volatile modifier is a ketone having about 3 to 12 carbon atoms.

5. The method according to claim 1 wherein said volatile modifier is a low molecular ester.

6. The method of claim 1 wherein said volatile modifier is a low molecular weight organonitrile.

7. The method of claim 2 wherein said film, after the initial exposure and before the second exposure, is subjected to heat treatment for a total time of about two minutes, said heat treatment comprising subjecting the exposed film to a temperature gradient whereby the film is subjected first to a lower range of temperature and then to a higher range of temperature, said lower range being effective to void molecular nitrogen from the film and said higher range temperature being effective to void volatile modifier from the film.

References Cited in the file of this patent

UNITED STATES PATENTS

| | | |
|---|---|---|
| 2,684,341 | Anspon et al. | July 20, 1954 |
| 2,699,392 | Herrick et al. | Jan. 11, 1955 |
| 2,703,756 | Herrick et al. | Mar. 8, 1955 |
| 2,908,572 | Schoen | Oct. 13, 1959 |
| 2,911,299 | Baril et al. | Nov. 3, 1959 |
| 2,923,703 | Bruni et al. | Feb. 2, 1960 |
| 2,950,194 | Glavin | Aug. 23, 1960 |
| 3,032,414 | James et al. | May 1, 1962 |

FOREIGN PATENTS

| | | |
|---|---|---|
| 571,682 | Canada | Mar. 3, 1959 |